United States Patent [19]
Abe et al.

[11] Patent Number: 5,529,483
[45] Date of Patent: Jun. 25, 1996

[54] COMPRESSION EQUIPMENT OF INJECTION COMPRESSION MOLDING MACHINE AND INJECTION COMPRESSION MOLDING MACHINE

[75] Inventors: Tomokazu Abe, Ichihara; Tsuneo Matsui, Sanjo, both of Japan

[73] Assignees: Idemitsu Petrochemical Co., Ltd., Tokyo; Kyowa Industrial Co., Ltd., Sanjyo, both of Japan

[21] Appl. No.: 306,101

[22] Filed: Sep. 14, 1994

[30] Foreign Application Priority Data

Sep. 14, 1993 [JP] Japan .................................. 5-228724

[51] Int. Cl.⁶ .................................................. B29C 45/66
[52] U.S. Cl. ........................ 425/589; 425/451.6; 425/593; 425/595
[58] Field of Search .................... 425/589, 590, 425/592, 593, 595, 451.4, 451.3, 451.5, 451.6, 451.7

[56] References Cited

U.S. PATENT DOCUMENTS

| | | | |
|---|---|---|---|
| 3,156,014 | 11/1964 | Wenger | 425/589 |
| 3,669,599 | 6/1972 | Snider et al. | 425/451,7 |
| 4,184,835 | 1/1980 | Talbot | 425/577 |
| 4,535,689 | 8/1985 | Putkowski | 425/451.7 |
| 4,715,804 | 12/1987 | Takahashi | 425/141 |
| 4,980,115 | 12/1990 | Hatakeyama et al. | 264/328.7 |

FOREIGN PATENT DOCUMENTS

| | | |
|---|---|---|
| 36-1477 | 1/1961 | Japan . |
| 48-25749 | 4/1973 | Japan . |
| 1453276 | 10/1976 | United Kingdom . |
| 1493300 | 11/1977 | United Kingdom . |

*Primary Examiner*—Tim Heitbrink
*Attorney, Agent, or Firm*—Flynn, Thiel, Boutell & Tanis

[57] ABSTRACT

A compression equipment possesses generality of various injection molding machine by which injection and mold under compression is performed. The compression equipment is composed as a unit and is installed between a moving die plate of the injection molding press and a moving mold. The compression equipment possesses a moving mechanism containing first tapered members moved by a cylinder and second tapered members contacting with the first tapered members and the moving mold moves toward a stationary mold by the cylinder.

13 Claims, 10 Drawing Sheets

COMPRESSION EQUIPMENT OF INJECTION COMPRESSION MOLDING MACHINE AND INJECTION COMPRESSION MOLDING MACHINE

BACKGROUND OF THE INVENTION

1. Field of the Invention

The present invention is concerned with a compression equipment for injecting and molding a workpiece under compression and with an injection compression molding machine.

2. Description of the Related Art

Injection compression molding has been recognized as a preferable method of molding a thin molding of polymeric material with low bowing and distortion. A conventional injection compression molding machine for forming moldings is provided with a stationary die plate on which a stationary mold is secured, a moving die plate to which a moving die is secured, a mold clamping apparatus for moving reciprocally the moving die plate toward the stationary die plate, and compression equipment for further compressing and moving the moving mold until it is in a position at which the mold clamping apparatus makes a small aperture with reference to the stationary mold after filling up with the molten resin.

The compression equipment employed in the above conventional injection compression molding machine is taught in Japanese Utility Model Application Laid-open No. 48-25749 and the Japanese Patent Application Publication No. 36-1477. As set forth in these documents, the moving die plate is moved by a different cylinder from a mold clamping apparatus and a cylinder which moves the moving mold into the moving die plate is provided.

Because the compression equipment is a constructing part of the injection compression molding machine in this prior art, the moving die plate, for example, needs to be modified on a large-scale into a construction provided with the compression equipment when a general injection molding machine performs injection and mold under compression. In other words, these injection molding machines need to be significantly reconfigured in order to inject and mold under compression by various injection molding machines when the mold clamping forces are different, so that the conventional compression equipment can be said that it does not possess generality of the injection molding machine.

An object of this invention is to provide a compression equipment of the injection compression molding which possess the generality of various injection molding machine and injects and molds under compression without significant reconfiguration of the injection molding machine on a large-scale and an injection compression molding machine provided with a compression equipment.

SUMMARY OF THE INVENTION

This invention is directed to an injection compression molding machine having; stationary die plate with a stationary mold, a moving die plate provided with a moving mold that can move reciprocally to and away from the stationary die plate, a mold clamping apparatus moving reciprocally the moving die plate toward the stationary die plate; and a moving mechanism composed as a unit, installed between the moving die plate and the moving mold, and moving the moving mold toward the stationary mold.

A cylinder or motor, for example, is adopted as a driving source of the previous moving mechanism. When a cylinder is adopted as the driving source, it is preferred that the reciprocal-movement direction of the associated piston rod be perpendicular to the moving direction.

First tapered members on the moving die plate and second tapered members on the moving mold can be employed as the moving mechanism. In these versions of the invention, the tapered members abut. Thus, one tapered member should be able to move in a perpendicular direction to a moving direction of the moving mold by a driving force from a driving source, and the other tapered member should remain fixed.

Either one or more moveable tapered members can be provided by this invention. When a plurality of tapered members are provided, in order to move the tapered members in a synchronous pattern, a synchronizing member should connect the individual tapered members. One example of a synchronizing member is a toothed wheel. The wheel has a toothed portion arranged to mesh with one set of the tapered members in order to move members together.

In some versions of the invention a tapered member is provided that is not connected to the driving source. This tapered member is located between the tapered members that are connect to the driving source. This tapered member has a toothed portion that is engaged with the toothed wheel so that the moving force of the driven tapered members can be transmitted to this third tapered member. In these versions of the invention addition tapered members are provided that contact the tapered member that is driven off the toothed wheel.

In still other versions of the invention, a plate member attached to the moving die plate is provided with the compression equipment and contacting portions of the plate stop the movement of the moving die plate toward the stationary die plate. In these versions of the invention, after the contacting portions of the moving and stationary die plates abut, the moving mold begins to compress and move toward the stationary mold by the previous moving mechanism.

These contacting portions may be either portions formed to integrate with the plate member and or be in the form of spacers that are freely installed and removed. When spacers are utilized, the spacers are free to be interchangeable in order to provide the operate separation distance and resultant compression when the moving mold moves toward the stationary mold by the moving mechanism.

The first and second tapered members may be ring-shaped members, one of which rotates in the direction of the moving mold. In this embodiment of the invention, the moving direction of the moveable tapered members is considered as a rotational direction around a ring central portion.

An injection compression molding machine constructed in accordance with this invention is provided with the stationary die plate attached thereto with the stationary mold, the moving die plate which is provided with the moving mold and moves reciprocally toward the stationary die plate, and moves to open and close the moving mold toward the stationary mold. The mold clamping apparatus reciprocally moves the moving die plate toward the stationary die plate. The compression equipment which is composed as a unit is installed between the moving die plate and the moving mold and compresses and moves the moving mold toward the stationary mold. The contacting portion which is provided with either the moving die plate or the stationary die plate stops the movement of the moving die plate by the mold clamping apparatus toward the stationary die plate in the middle of halfway. After the movement of the moving die plate toward the stationary die plate stops in the middle of halfway, the moving mold begins to compress and moves toward the stationary mold by the compression equipment.

These contacting portions may be either portions formed to be integrated with at least either the moving die plate or the stationary die plate and or spacers which are freely installed and removed. When spacers are employed, the spacers are freely exchangeable with ones possessing useful length establishing different dimensions between the moving mold so as to establish different degrees of compressive force between the molds.

The compression equipment is capable of being installed with various kinds of injection molding machines. This compression equipment also makes it possible to inject and mold under different compressive loads without having to significantly reconfigure the injection molding machine.

When the driving source of the moving mechanism in the compression equipment is a cylinder, the reciprocal-movement direction of the piston rod is perpendicular to the moving direction of the moving mold. With these versions of the invention, the overall size of the compression equipment is kept relatively low.

The moving mechanism is composed of the first tapered member on the moving die plate's side and the second tapered member on the moving mold's side. The tapered surfaces contact each other and taper toward the moving direction of the moving mold. One tapered member moves in a direction perpendicular to the moving direction of the moving mold as the result of the application of a driving power from the driving source. The displacement of the tapered member results in displacement of the moving mold toward the stationary mold as a result of the pushing operation of the tapered surfaces toward each other.

When there are plural moveable tapered members, the tapered members are moved in a synchronized pattern. An advantage of the synchronized movement is that it allows the moving mold to maintain a parallel accuracy with the stationary mold and thereby the sliding-contact surfaces of the stationary mold and the moving mold is not worn and damaged. This serves to prolong mold life and burrs in moldings are also substantially reduced.

When the contacting portions are provided on plate members of the compression equipment and the contacting portions connected on the stationary die plate stop movement of the moving die plate toward the stationary die plate by the mold clamping apparatus, or when the contacting portion is provided with either the moving or stationary die plates, this contacting portion stops movement of the moving die plate toward the stationary die plate by the mold clamping apparatus. The continued actuation of the mold clamping causes the moving mold to compress and move toward the stationary mold. Highly accurate moldings are then obtained because the moving mold compresses and moves toward the stationary mold and the compression equipment is urged constantly toward the stationary die plate by the mold clamping apparatus and the moving die plate can not move forward and return.

When the contacting portions are spacers, the spacers are free to be replaced by spacers possessing both a dimension of the moving mold and the stationary mold in the moving direction of the moving mold and a dimension complied with the desired compression movement. The molding can then be performed by exchanging the spacers with ones possessing an adequate dimension for forming other moldings.

DETAILED DESCRIPTION OF THE PREFERRED EMBODIMENT(S)

The preferred embodiments of the present invention will hereunder be described with reference to the drawings.

Figure 1:
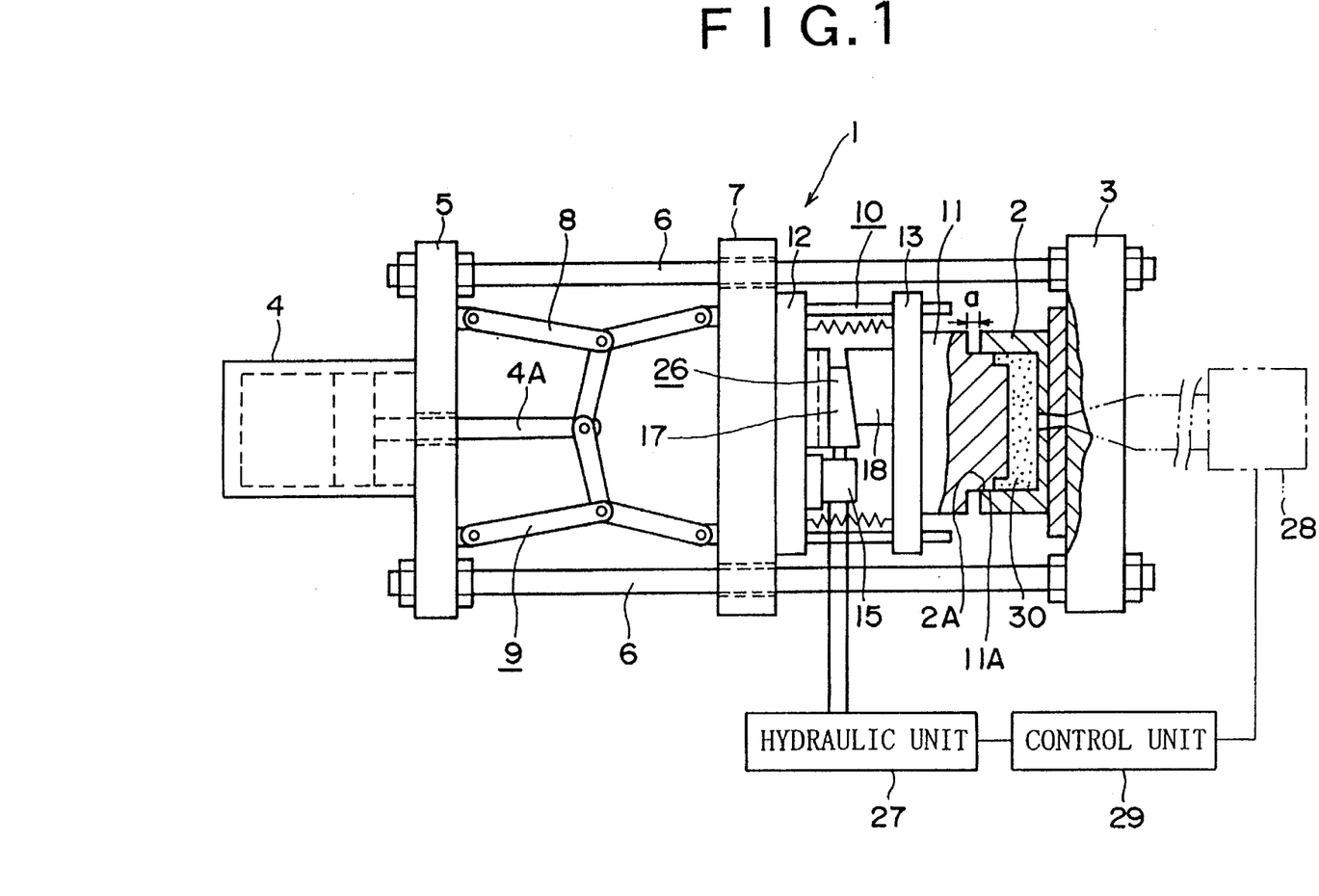
FIG. 1 is a drawing showing an injection compression molding machine provided with a compression equipment according to the first embodiment of the present invention and a block diagram of a control system.

FIG. 1 depicts an injection compression molding machine 1 provided with compression equipment in accordance with the first embodiment of this invention. This injection compression molding machine 1 has at one end a stationary die plate 3 with a stationary mold 2. A stationary plate 5 is provided the opposed end with a mold clamping cylinder 4. Plural tie bars 6 extend between the stationary die plates 3 and 5. A moving die plate 7 is arranged to move reciprocally along the tie bars 6 between the stationary die plates 3 and 5. A toggle mechanism 8 is connected by a piston rod 4A integral with the mold clamping cylinder 4 between the stationary plate 5 and the moving die plate 7. A mold clamping apparatus 9 is defined by the mold clamping cylinder 4 and the toggle mechanism 8. The moving die plate 7 is fitted with a moving mold 11 by means of compression equipment 10 in accordance with the present embodiment of the invention. Moving die plate 11 moves reciprocally toward and away from the stationary die plate 3 and the stationary mold 2 as a result of the actuation of the mold clamping apparatus 9.

Figure 2:
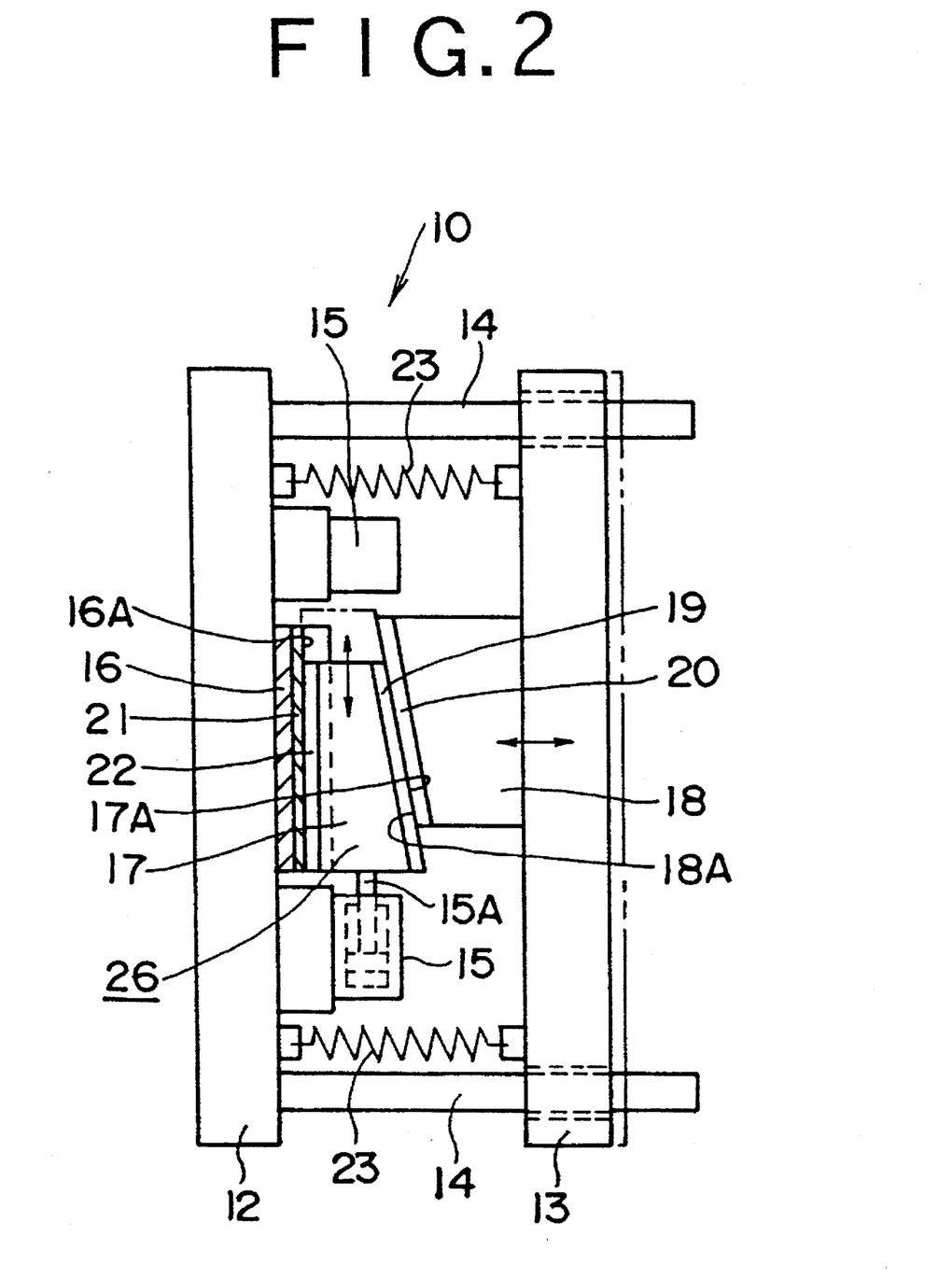
FIG. 2 is an enlarged view of the compression equipment shown in FIG. 1.
Figure 3:
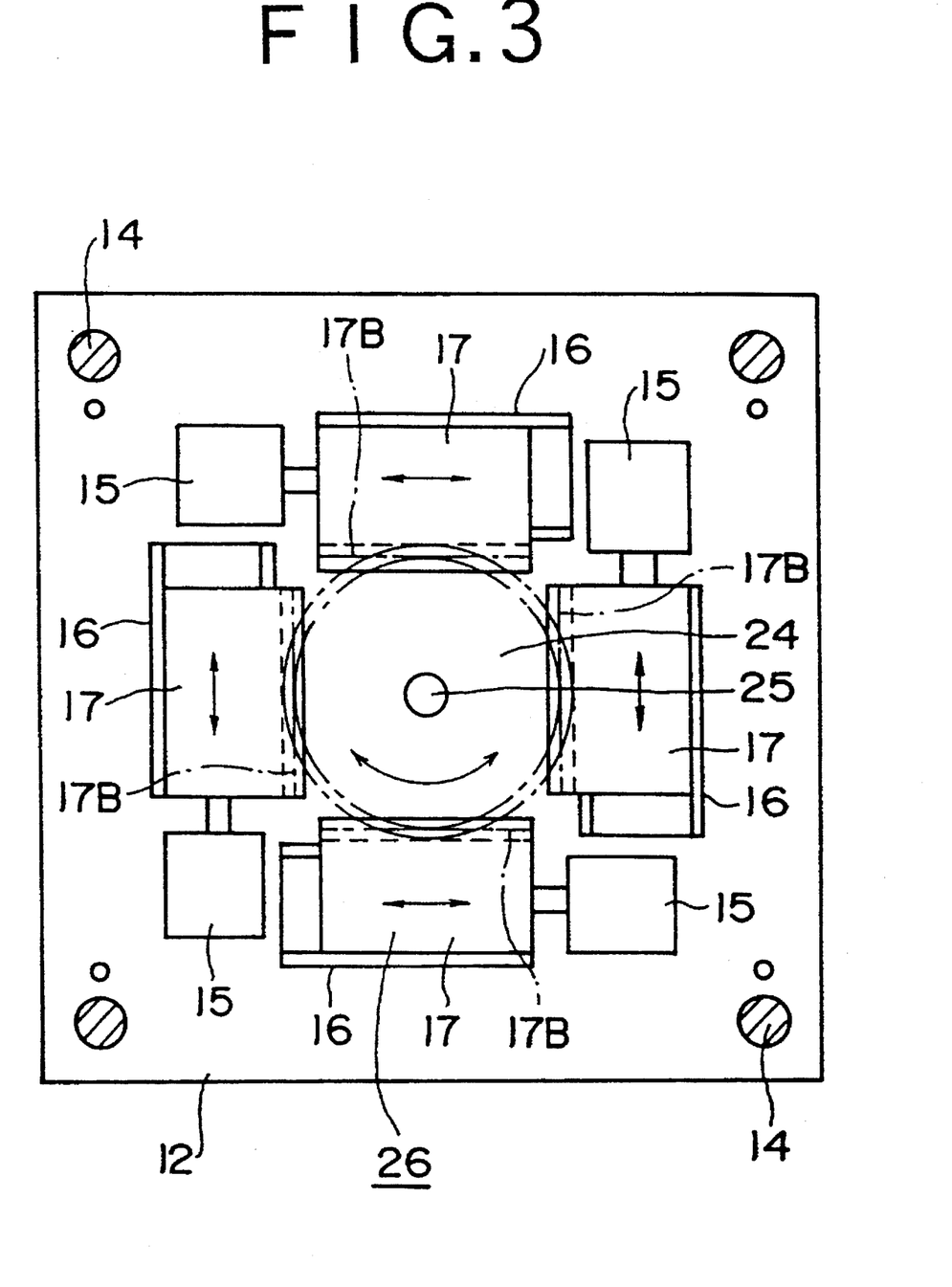
FIG. 3 is a drawing showing an arrangement of each member attached to a first plate member of the compression equipment in FIG. 2.

FIGS. 2 and 3 depict the compression equipment 10 located between the moving die plate 7 and the moving mold 11. The compression equipment 10 has the first plate member 12 secured to the underside of the moving die plate 7 and a second plate member 13 secured to the top side of the moving mold 11. The second plate member 13 moves reciprocally along a set of guide bars 14 which are mounted at one end to the first plate member 12. The first plate member 12 is further provided with downwardly directed piston cylinders 15 with piston rods 15A that can be moved in a reciprocal path of travel which is perpendicular to the moving direction of the moving mold 11. The free ends of piston rods 15A are attached to first tapered or slanting surface members 17. Each first tapered member 17 is slidably fitted in a guide groove 16A that is formed in a guide member 16 that is firmly secured to the first plate member 12. A second tapered or slanting surface member 18 is secured to the second plate member 13.

Tapered members 17 and 18 are contacted with each other along tapered surfaces 17A and 18A, respectively. Tapered surfaces 17A and 18A are arranged to be diagonally inclined along the moving direction of the moving mold 11. The tapered surfaces 17A and 18A are provided with hardwearing members 19 and 20, respectively that serve as the actual physically abutting components of the invention. The adjacent sliding-contact surfaces of guide member 16 and first tapered member 17 are also provided with hardwearing members 21 and 22, respectively. Return strings 23 that extend between the first plate member 12 and the second plate member 13 constantly urge the second plate member toward the first plate member 12.

As shown in FIG. 3, there are four cylinders 15 and four first tapered members 17. The first tapered members 17 are arranged around a toothed wheel 24. Wheel 24 is rotatably attached to a shaft 25 which extends parallel to the moving direction of the moving mold 11. Each first tapered member 17 has a toothed portion 17B meshed with the toothed wheel 24 in the groove and therefore the first tapered members 17 move in a synchronized pattern along axes perpendicular to the moving direction of the moving mold 11.

The four second tapered members 18 contacting the first tapered members 17 are attached on the second plate member 13 corresponding to the places of the first tapered members 17.

The first tapered members 17 move forward as a result of the pushing operation of the piston rods 15A of the cylinders 15. The second plate member 13 and moving mold 11 are thus urged by the second tapered members 18 toward the stationary mold 2. The first and second tapered member 17 and 18 thus form a moving mechanism 26. The cylinders 15 are the driving sources of the moving mechanism 26.

The compression equipment 10 is attached to the injection compression molding machine 1 as in FIG. 1 by securing the first plate member 12 to the moving die plate 7, and the second plate member 13 to the moving mold 11, respectively, by bolts or others and can remove from the injection compression molding machine 1.

The operation of the invention will be explained next.

After the compression equipment 10 is attached to the injection compression molding machine 1 as in FIG. 1, each cylinder 15 of the compression equipment 10 is connected to a hydraulic unit 27. A control unit 29 of the injection system 28 is connected with the hydraulic unit 27. An injection nozzle of the injection system 28 is connected with a sprue bush installed into the stationary die plate 3. The piston rod 15A of the cylinder 15 in the compression equipment 10 returns and the moving die plate 7, the compression equipment 10 and the moving mold 11 move forward by the mold clamping apparatus 9 and the compression equipment 10 stops with keeping a mold opening degree "a" (for example, from 0.1 mm to 100 mm) between the stationary mold 2 and the moving mold 11. Next, molten resin is filled up with a cavity 30 between the stationary mold 2 and the moving mold 11 from the injection nozzle of the injection system 28. The molten resin is thermoplastic resin, which can be a general-purpose resin such as polyethylene, polypropylene, polystyrene and others, engineering plastics such as polycarbonate, polyamide, polyacetal and others, and all kinds of polymeric materials which can be used for an injection molding.

After a fixed time has passed from the start of the molten resin injection from the injection system 28 or injection screw of the injection system 28 reaches a fixed position, the hydraulic unit 27 starts by an electric signal from the control unit 29. The piston rods 15A of the cylinders 15 then move forward, the first tapered members 17 are then displaced so as to cause alike displacement in the second tapered members 18 and the second plate 13 which, in turn, serves to urge the moving mold 11 a degree "a" to secure mold 11 and the stationary mold 2.

In this embodiment of the invention, the engagement of the individual tapered members 17 to the common toothed wheel insures that the tapered members 17 move in a synchronized pattern. Thus, the incorporation of the toothed wheel substantially eliminates the possibility that hydraulic fluid flow patterns or other variations will cause asynchronous movement of the tapered members which could result in uneven movement of moving mold 11.

The second plate member 13 does not lean against the first plate member 12 and the second plate member 13 and the moving mold 11 move forward maintaining a parallel accuracy constantly against the stationary mold 2 and in this consequence, inrow portions of a slide-coupling portion 2A and 11A of the stationary mold 2 and the moving mold 11, respectively, can not be worn and damaged.

After the moving mold 11 is compressed and moves by a degree of "a" by the compression equipment 10, the compressing state is maintained for a fixed period of time. The molten resin is cooled down and solidified in the cavity 30 and moldings are formed. Afterwards, the moving die plate 7, the compression equipment 10 and the moving mold 11 return and open the molding. The opening process starts by having the first tapered members 17 return to their previous position by retracting the piston rods 15A of the cylinders. This causes the second plate member 13 to return to its initial position with the aid of the return springs 23. Once the molds 2 and 11 are spaced apart a sufficient distance, the moldings are taken out. The molding machine 1 is then ready to form a new molding.

In the molding machine 1 of this invention, because the compression equipment 10 located between the moving die plate 7 and the moving mold 11 is essentially a separate unit, it can readily be utilized for the different mold clamping forces of injection molding machine and contains generalization. Thus, the injection molding machine 1 of this invention can readily and economically be reset to provide different compression forces depending on the items it is being used to form.

Moreover, because the piston rods 15A move the first tapered member 17 perpendicularly to the moving direction of the moving mold 11, the compression equipment 10 does not occupy a significant amount of space or extend beyond the sides of the molding machine 1.

The four first tapered members 17 mesh with the toothed wheel 24 which functions as a synchronizing member. Thus, the first tapered members 17 move in a synchronized pattern so that the moving mold 11 moves forward maintaining constantly parallel accuracy against the stationary mold 2. This prevents the inrow portion of the slide-coupling portions 2A and 11A of the molds 2 and 11 from becoming worn and damaged. The elimination of this wear and damages serves to prolong the life of the molds. Furthermore, the exact parallel movement of the moving molds substantially eliminate the appearance of mold flash of moldings caused when the inrow mold portions 2A and 11A are worn and damaged.

Furthermore, by selectively establishing the tilt angles of the tapered surfaces 17A and 18A of the first and second tapered members 17 and 18, the movement of the moving mold 11 operation stroke of the piston rods 15A of the cylinder 15 can be selectively set. Thus, one could readily reconfigure the needed length of the piston rod 15A strokes of molding machine 1 of this invention by simply providing tapered members with appropriately inclined surfaces 17A and 18A, respectively.

Because hardwearing members 19–22 are employed as the contacted elements of the first and second tapered members 17 and 18, respectively, and for the guide members 16, the wear of these components is decreased even though the injection and compression molding works are done many times and thereby when the moving mold 11 clamps in the compression equipment 10 against the stationary mold 2. Furthermore, since the wear of the guide members 16 and tapered members 17 and 18 is substantially eliminated, accurate moving mold positions maintained and moldings of a fixed accurate thickness are produced.

Next, a result of examples about a device in accordance with this embodiment and molding examples enforced for evaluating the result of examples will be explained.

Result of Examples

The injection compression molding was performed using polypropylene (Idemitsu Polypro J-750H produced by Idemitsu Petrochemical Co., Ltd.).

A generalized horizontal type injection molding machine was utilized for an injection molding machine (injection screw diameter 55 mm, a mold clamping force 200 t, produced by Toshiba Kikai Co., Ltd.). The compression equipment of the previous embodiment was installed with this molding machine and synchronization was maintained by a signal from an injection start and moldings were formed.

The dies installed in the stationary and moving molds were 400 mm length, by 250 mm width and by 1.5 mm thickness. A gate was provided by a side gate on a short side. The die was constructed for an inrow to prevent from an appearance of mold flash.

The molding condition were as follows.

molding temperature 220° C.

die temperature 40° C.

injection period 2 seconds injection pressure 90 kg/cm$^2$ (gauge pressure)

cooling period 30 seconds die mold opening degree 4 mm compressing start time after 1.8 seconds from an injection's start compressing speed 8 mm/second compressing force 150 t Evaluation An unbalanced load occurred against the die because of the side gate, however, because of the synchronization of the first tapered members 17 was maintained by the toothed wheel 24, the die closed in parallel and moldings of which thickness was uniformed and which had minimal bowing were obtained.

Molding Example 1

The same material as the result of examples and an injection molding machine (injection screw diameter 55 mm, compressing force maximum 200 t, Toshiba Kikai Co., Ltd., direct-pressure type mold clamping apparatus) which is capable of injection compression molding was utilized, the same die was also used, and moldings were obtained.

The molding condition were as follows.

molding temperature 220° C.

die temperature 40° C.

injection period 2 seconds injection pressure 90 kg/cm$^2$ (gauge pressure)

cooling period 30 seconds die mold opening degree 4 mm compressing start time after 1.8 seconds from an injection's start Evaluation Though moldings were obtained, a dispersion of thickness by an unbalanced load occurred (1.65 mm on a gate side, 1.4 mm on a terminal portion).

When moldings were formed by 50 shots, scorings occurred on a mold flash appearance prevention structure of the die and it seemed to damage the die by continuing to form moldings.

Molding Example 2

The compression equipment of the previous embodiment was utilized because of the same material, molding machine, die and molding condition as the result of examples, however, the toothed wheel synchronizing with the cylinder and the first tapered member was removed and moldings were formed. That is, four cylinders and the first tapered members were not synchronized.

Evaluation

Moldings could be obtained, however, dispersion of thickness by the unbalanced load occurred (1.7 mm on a gate side, 1.3 mm on a terminal portion).

There was also scoring in an inrow structure occurred at the first shot.

From the above results of examples and the molding examples, it is clear that a technical advantage was gained by ensuring the synchronized movement of the cylinders 15 and first tapered members 17.

Figure 4:
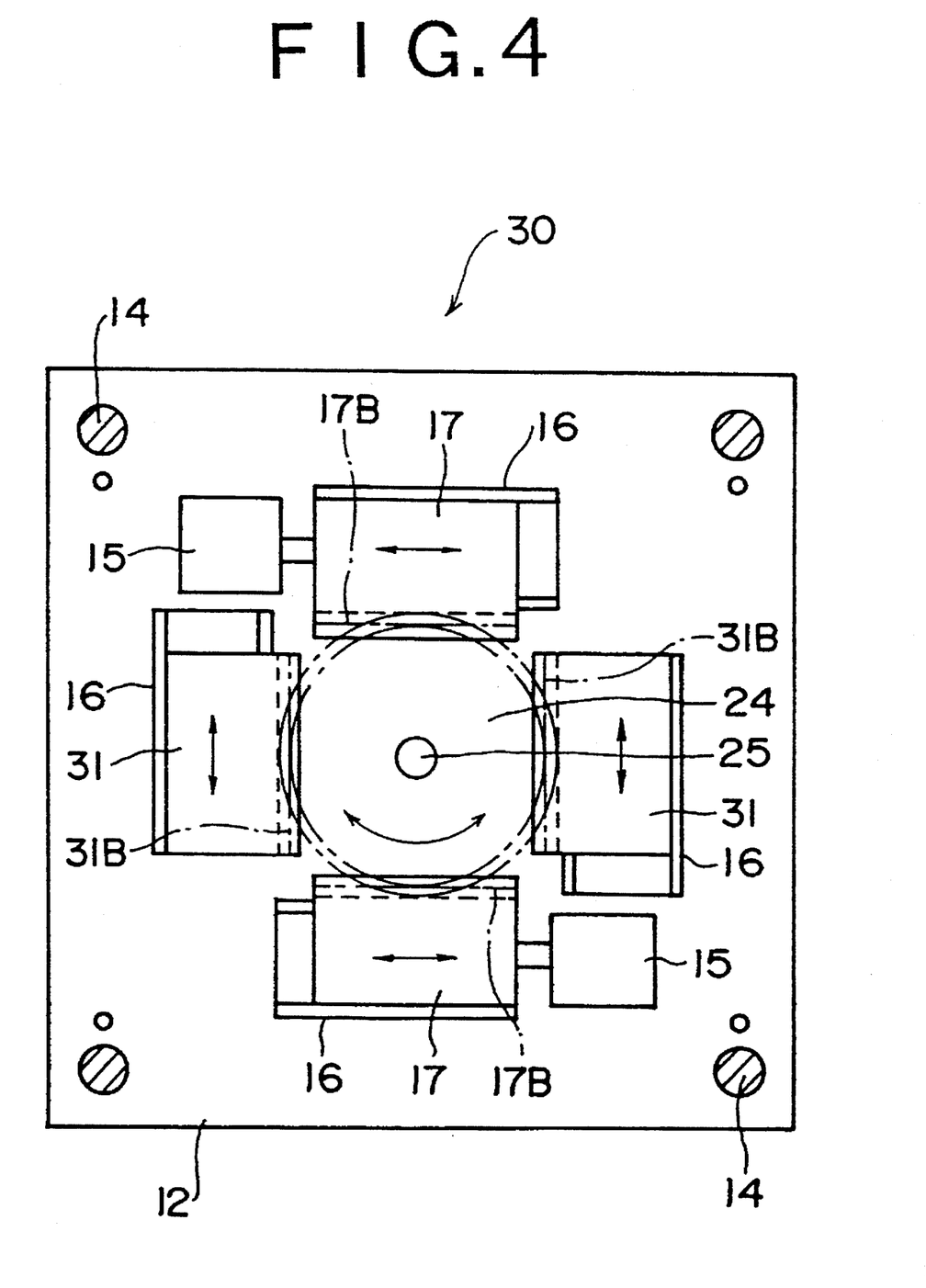
FIG. 4 is the same drawing as FIG. 3 showing a compression equipment in accordance with the second embodiment of this invention.

FIG. 4 is similar to FIG. 3 and illustrates compression equipment 30 in accordance with the second embodiment of this invention. The same reference numerals are used to designate the same or similar components as those in the first embodiment. In this embodiment, there are two first tapered members 17 moved by the cylinders 15 on both sides of the toothed wheel 24. Third tapered members 31, which are not connected to cylinders 15, are located between the first tapered members 17. Though not shown in the Figure, there are two second tapered members corresponding to the first tapered members 17 on a second plate member of the moving mold in the compression equipment 30. Fourth tapered members contacting with the third tapered members 31 are located between the second tapered members. The third tapered members 31 have toothed portions 31B meshing with the toothed wheel 24. When the first tapered members 17 move by the cylinders 15, this movement is transmitted to the third tapered members 31 by the toothed wheel 24.

According to this embodiment of the invention, only two cylinders 15 are employed as driving sources. This decreases the number of drivers and simplifies the whole structure of the molding machine.

Figure 5:
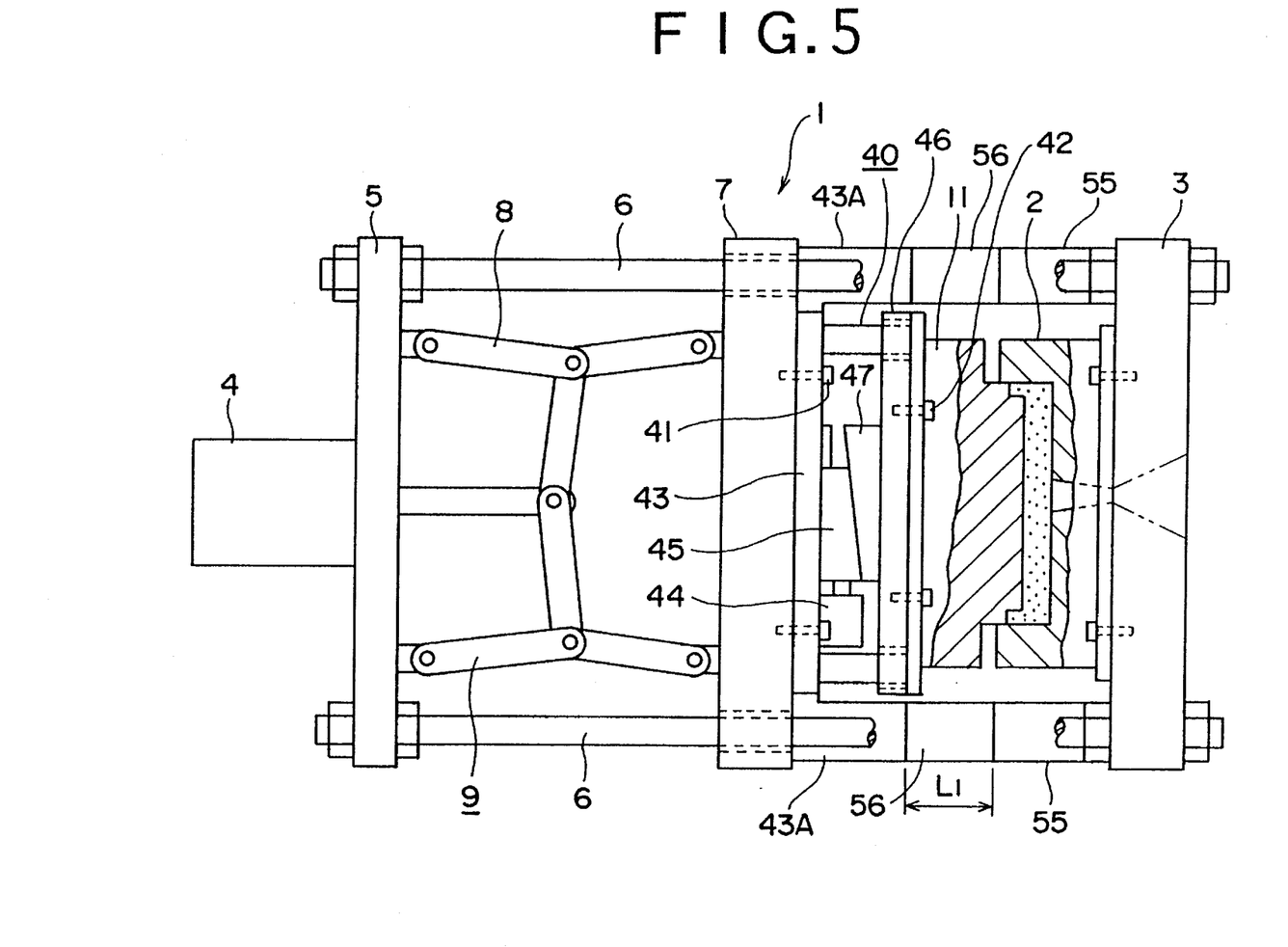
FIG. 5 is the whole drawing of the injection compression molding machine provided with a compression equipment in accordance with the third embodiment of this invention.

FIG. 5 illustrates a compression molding machine 1 provided with compression equipment 40 in accordance with the third embodiment of this invention. The control system of the hydraulic unit and others is the same as the one shown in FIG. 1 and is abbreviated in this FIG. 5. The compression equipment 40 is attached to the moving die plate 7 and the moving mold 11 of the injection compression molding machine 1 by bolts 41 and 42. Compression equipment 40 is formed as a unit which can be disassembled freely and first tapered members 45 moving by cylinders 44 are mounted on a first plate 43 secured to the moving die plate 7. The second tapered members 47 that contact the first tapered members 45 are mounted on a second plate member 46 to which the moving mold 11 is secured.

Figure 6:
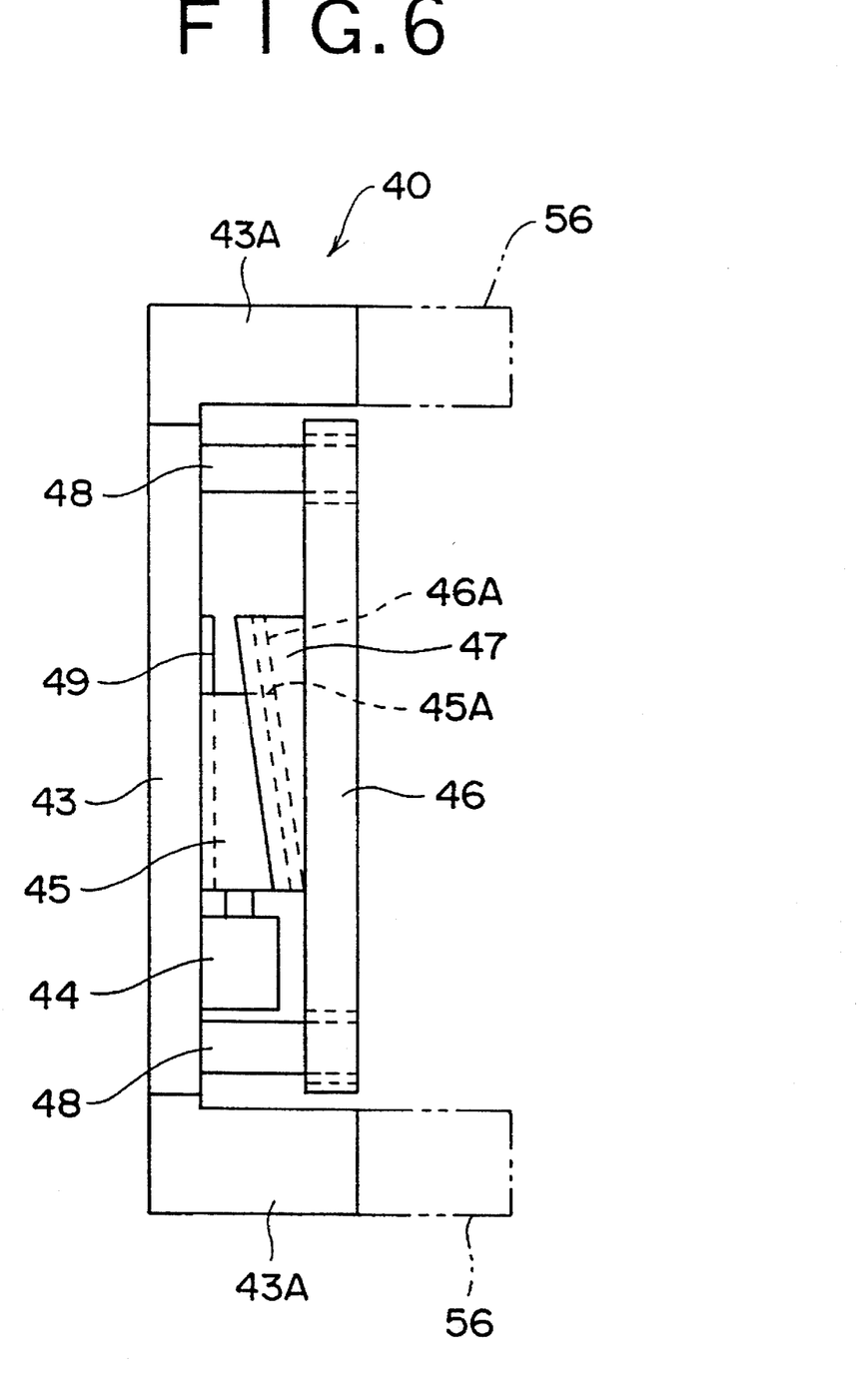
FIG. 6 is an enlarged view of the compression equipment shown in FIG. 5.
Figure 7:
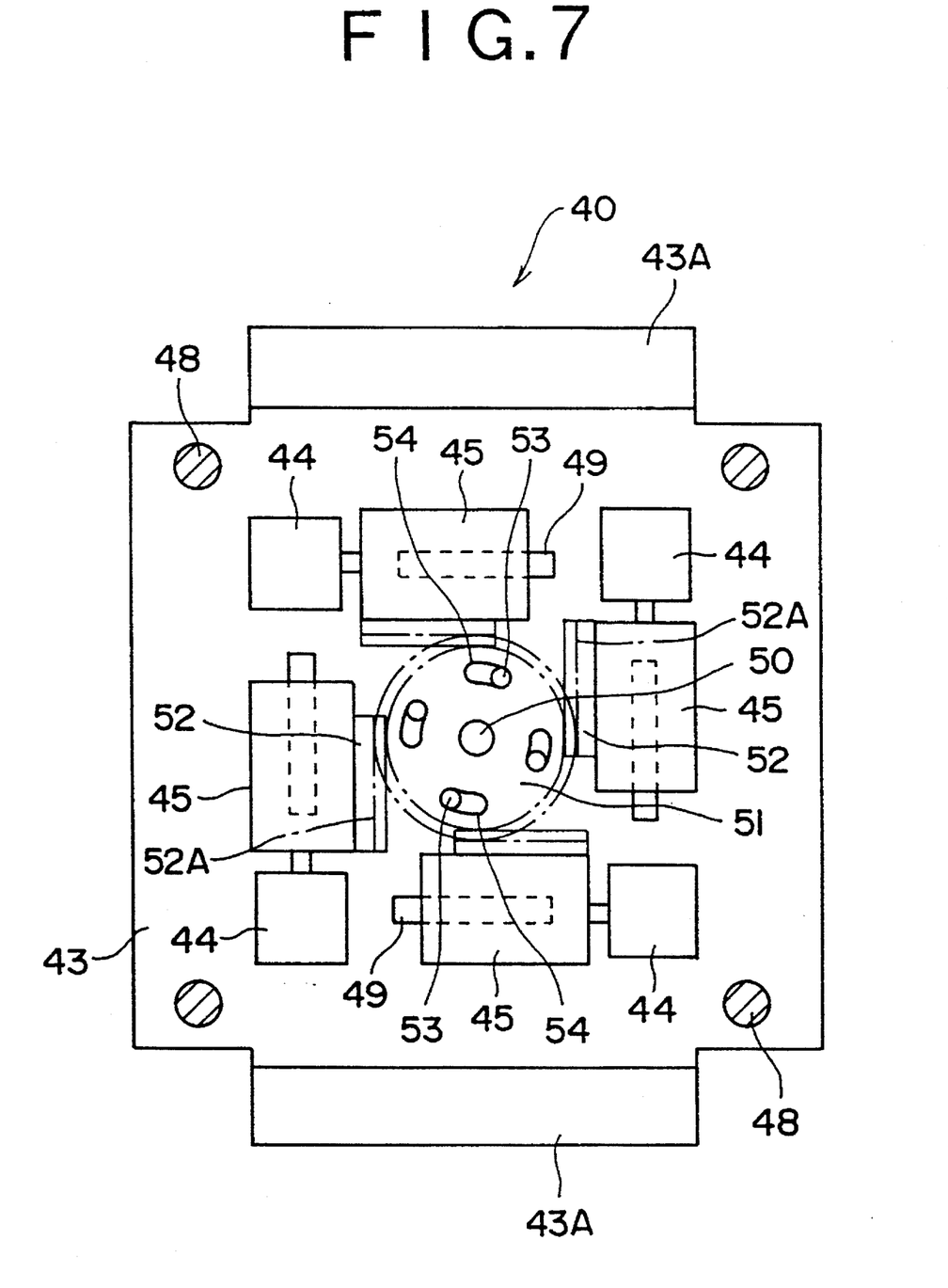
FIG. 7 is a drawing showing an arrangement of each member attached to the first plate member of the compression equipment in FIG. 6.

FIG. 6 is an enlarged drawing of the compression equipment 40. Each member arranged on the first plate member 43 in the compression equipment 40 is shown in FIG. 7. The second plate member 46 moves freely toward the first plate member 43 along guide bars 48. The first tapered members 45 move along rails 49 attached to the first plate member 43. Protrusions 45A integral with the first tapered members 45 are slidably seated within grooves 46A formed on the second tapered members 47 and thereby the first tapered members 45 and the second tapered members 47 maintain to contact constantly. Thus, as a consequence the return springs shown in FIG. 1 and 2 are not used in this embodiment.

As shown in FIG. 7, there are four first tapered members 45 around a toothed wheel 51 rotating around an axis 50. Accordingly, there are also four second tapered members 47. Each first tapered member 45 has a rack member 52 forming toothed portions 52A which mesh with the toothed wheel 51. The first tapered members 45 thus move in synchronization since the toothed wheel 51 functions as a synchronizing member. Circular-shaped elongated holes 54 are formed in the toothed wheel. Stopper pins 53 secured to the first plate member 43 are loosely inserted in the holes 54. The stopper pins 53 prevent excessive rotation of the toothed wheel 51 and like excessive movement of the first tapered members 45.

As seen in FIG. 5, projecting portions 43A that extend toward the stationary die plate 3 are formed integrally at the upper and lower portions of the first plate member 43. Projecting members 55 that extend toward the moving die plate 7 are attached at upper and lower portions of the stationary die plate 3 by bolts or other means. Spacers 56, which have a length L1 and are positioned to contact the stationary die plate 3 are attached from ends of the projecting portions 43A of the first plate member 43 by bolts or other means.

As a consequence, in this embodiment of the invention, when the moving die plate 7, the compression equipment 40 and the moving mold 11 are moved forward by the mold clamping apparatus 9 until reaching a selected position when spacers 56 abut the projected members 55 on the stationary die plate 3. Once this occurs, the moving die plate 7 and the components attached to the plate can not move forward farther. Moreover, owing to the force of the mold clamping apparatus 9, the die plate 7 can not move its return position. At this time, the moving mold 11 begins to compress and move by the moving mechanism of the compression equipment 40. Consequently, the moving mold 11 compresses and moves in a way that the moving die plate 7 is urged constantly toward the side of the stationary die plate 3 by the mold clamping apparatus 9 and mold clamping is performed constantly.

The spacers 56 are free to be exchanged by ones of a different dimension L1 and when the stationary mold 2 as the moving mold 11 is exchanged and moldings of which compression movement degree of the moving mold is different are formed, spacers having an appropriate dimension are exchanged. In this embodiment, a work of forming different moldings is performed by exchanging only spacers and using the same compression equipment.

The dimension of spacers forming the projected members 55 provided with the fixed stationary die plate 3 and thereby the projected members 55 can be changed and the dimension of spacers forming the projected portions 43A of the first plate member 43 and thereby the projected portions 43A can likewise be changed.

Figure 8:
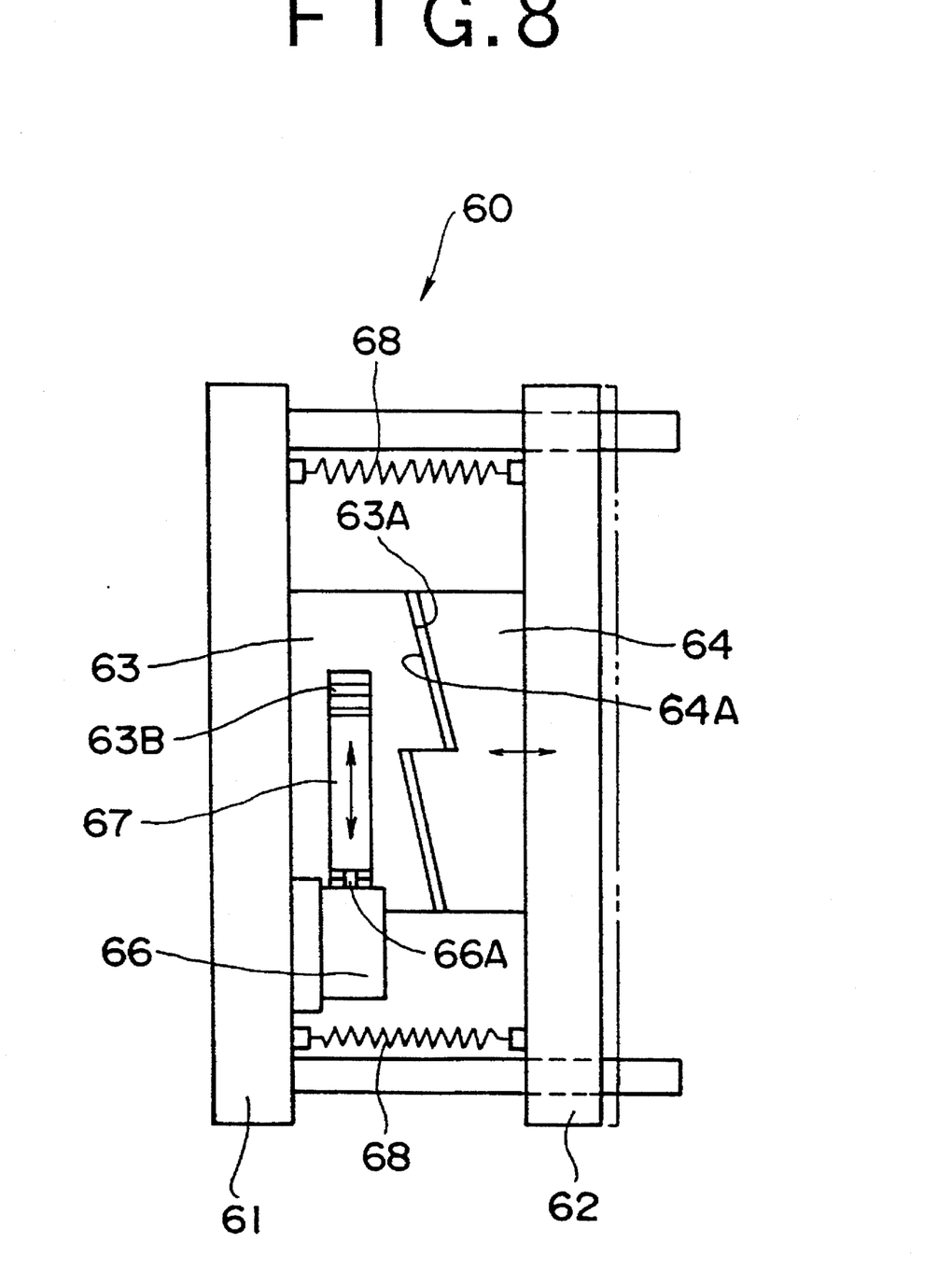
FIG. 8 is an enlarged view of a compression equipment in accordance with the fourth embodiment of this invention.
Figure 9:
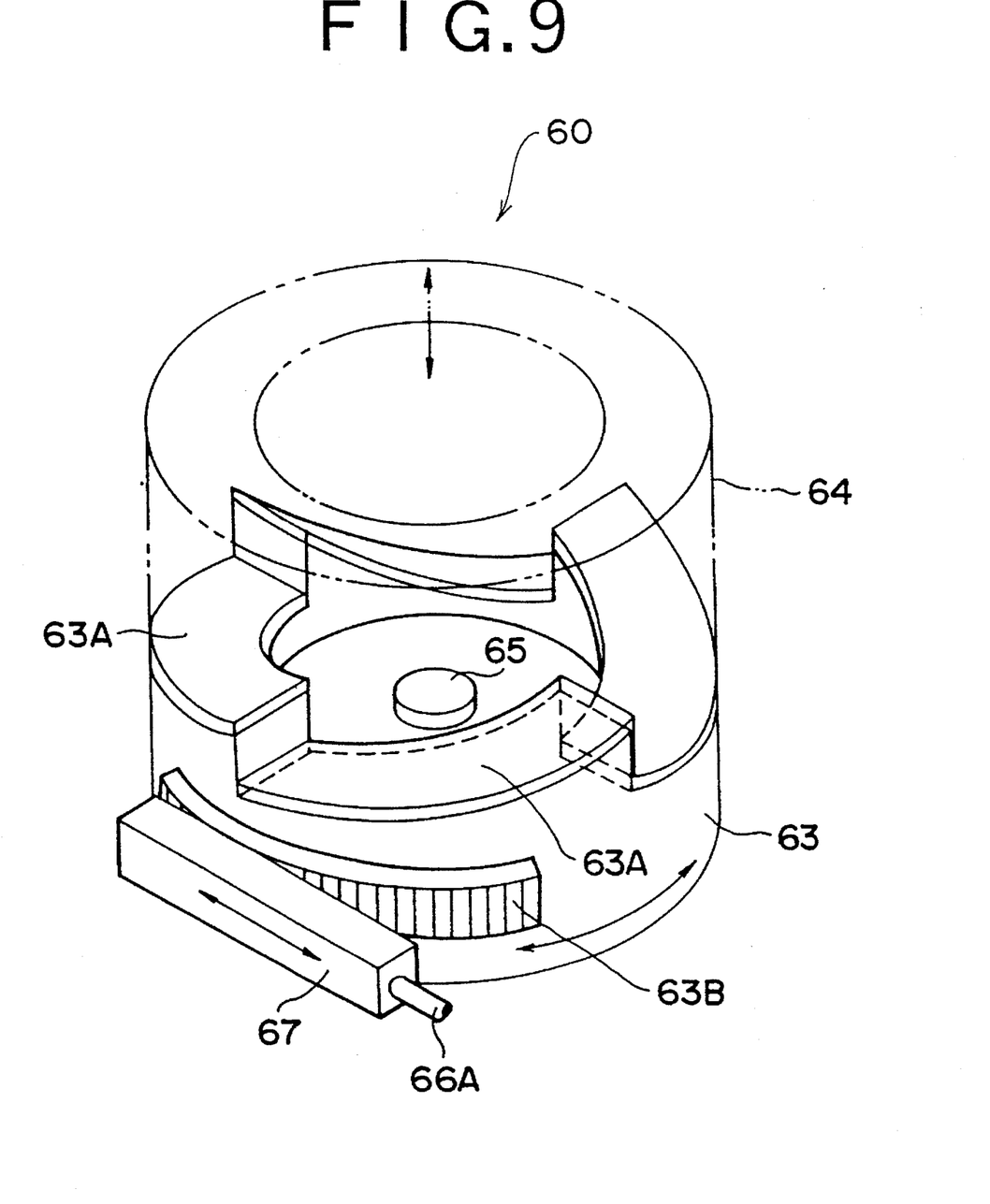
FIG. 9 is a perspective view showing ring first and second tapered members of the compression equipment in FIG. 8.

In FIG. 8, compression equipment 60 in accordance with the fourth embodiment is shown and in FIG. 9, the first and second tapered members 63 and 64 of the compression equipment 60 are shown. The first and second tapered members 63 and 64 are respectively secured to the first and second plate members 61 and 62 of the compression equipment 60. Each tapered member 63 and 64 is a ring-shaped member which extends axially along the line of movement of plate 7.

The first tapered member 63 on the first plate member 61 is free to rotate around an axis 65 provided in a ring central portion. The second tapered member 64 on the second plate member 62 is fixed to the second plate member 62. These tapered members 63 and 64 have tapered surfaces 63A and 64A contacting each other. The plural tapered surfaces 63A and 64A are arranged in a ring circumferential direction and have an inclined angle against a moving direction of a moving mold. A cylinder 66 is attached to first plate member 61 has a reciprocal-movement piston rod 66A. Piston rod 66A moves perpendicularly to the moving direction of a moving mold. A rack member 67 is provided at an end of the piston rod 66A. The rack member 67 meshes with a toothed portion 63B formed on a circumferential surface of the first tapered members 63.

In this embodiment of the invention, when the piston rod 66A of the cylinder 66 moves forward, the first tapered members 63 rotate around an axis 65 owing to the engagement of the rack member 67 to the toothed portion 63B. This rotation compresses and moves the moving mold 11 toward the stationary mold by the second tapered members 64 and the second plate member 62. When the piston rod 66A is retracted, the first tapered members 63 retract rotation and the second plate member 62 and the moving mold return to an original position by return springs 68.

According to this embodiment, synchronizing members like a toothed wheel or others are not necessary and therefore simplification of a structure and a decrease of number of members can be realized because one ring of the first and second tapered members 63 and 64 can be formed by using plural tapered surfaces 63A and 64A.

Figure 10:
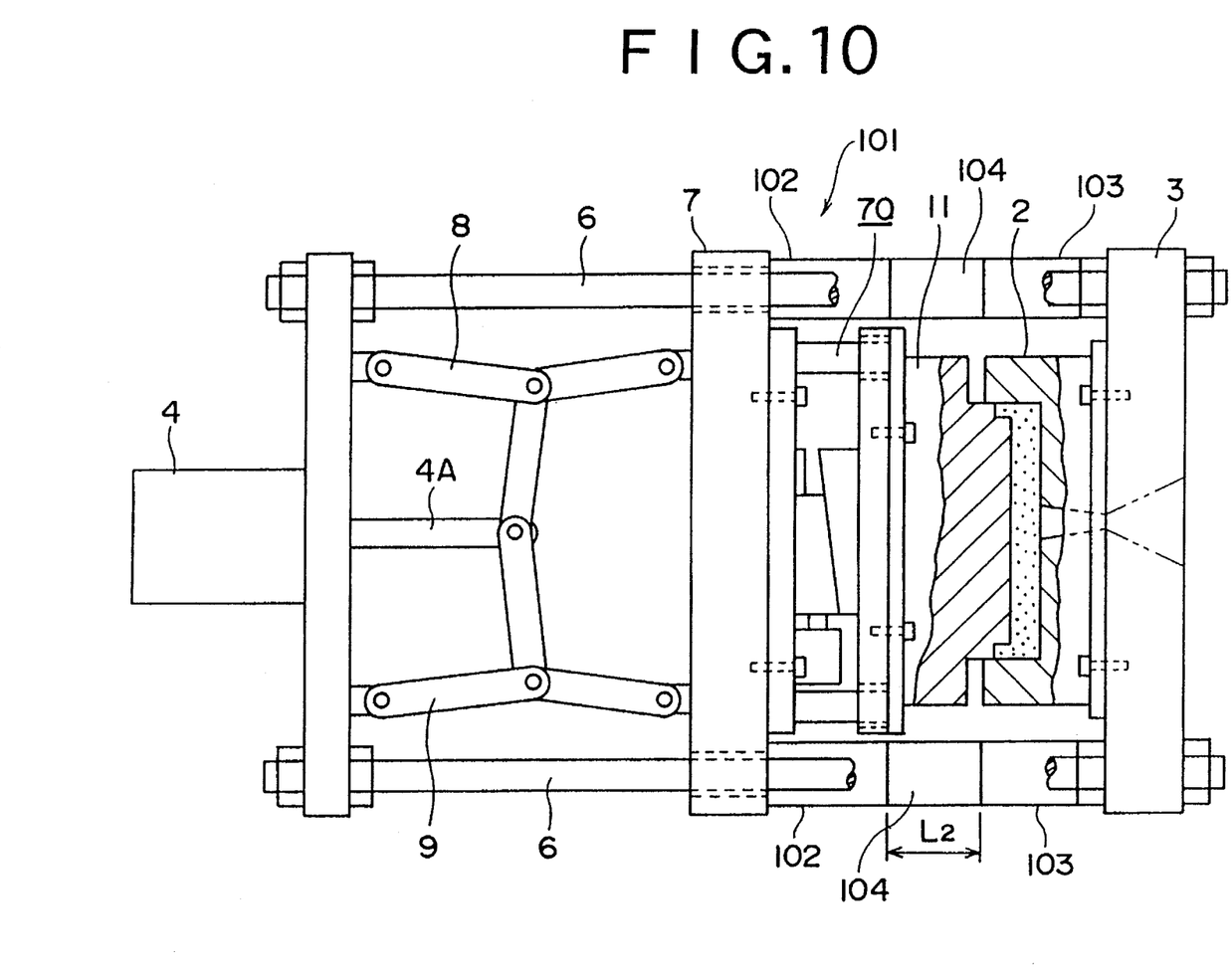
FIG. 10 is a whole drawing of an injection compression molding machine in an embodiment of this invention in which the same spacer as that in FIG. 5 is attached to a moving die plate.

FIG. 10 depicts an embodiment of an injection compression molding machine 101 providing with a compression equipment 70. The same reference numerals will be used to designate the same or similar components as those in the first embodiment, so that the description will be omitted or simplified. A stationary die plate 3 of the injection compression molding machine 101 and a moving die plate 7 are attached thereto. Projected members 102 are secured to the ends of moving die plate 7. Projecting members 103 are secured to the side of the stationary die plate 3. Projecting members 104 are attached to ends of the projected members 102 bolts or other means so that spacers 104 are free to be removed. Spacers 104 have a length L2. A compression movement by the moving mold 1 toward the stationary mold 2 results in the same type of compressive action as achieved with the embodiment of the invention described with respect to FIG. 5.

Because the spacers 104 abut the projected members 103 of the stationary die plate 3 when the moving die plate and others move forward by a mold clamping apparatus 9 and reach a position of the compression movement degree caused by the compression equipment 70 between the moving mold 11 and the stationary mold 2, a mold clamping by a compression and movement of the moving mold 11 is performed stably.

Different kinds of dimensions L2 as a spacer are prepared beforehand and spacers possessing appropriate dimensions are exchanged when models of the stationary mold 2 and the moving mold 11 are exchanged and moldings of which a compression movement degree of a moving mold is different are formed.

Spacers neither need to be attached to the projected members 103 of the stationary die plate 3 nor need to be attached to both the projected members 103 of the stationary die plate 3 and the projected members 102 of the moving die plate 7. Alternatively, the spacer 104 can be dimensioned to include at least one of the projecting members 102 and 103.

In the above embodiment of the invention, the first tapered members of the compression equipment on the moving die plate's side moves, however, the second tapered members on the moving mold's side can alternatively be employed as the moving spacers.

What is claimed is:

1. A compression molding assembly for an injection molding machine comprising;

an injection compression molding machine having a stationary die plate attached thereto with a stationary mold, a moving die plate provided with a moving mold, the moving die plate being configured to move reciprocally to and away from the stationary die plate so that the moving mold moves to open and close toward the stationary mold and a mold clamping apparatus that reciprocally moves the moving die plate toward the stationary die plate; and a moving mechanism composed as a unit, installed between the moving die plate and the moving mold, the moving mechanism being configured to move the moving mold toward the stationary mold.

2. The compression molding assembly according to claim 1, wherein said moving mechanism includes a cylinder as a driving source, said cylinder being configured to move a piston rod in a direction perpendicular to a moving direction of the moving mold.

3. The compression molding assembly according to claim 1, wherein said moving mechanism is composed of a first slanting surface member on the moving die plate and a second slanting surface member on the moving mold, said slanting surface members contacting each other and possessing slanting surfaces that are tapered with reference to a moving direction of the moving mold, one said slanting surface member being capable of moving in a direction perpendicular to the moving direction of the moving mold by a driving force from a driving source, and the other slanting surface member being in a fixed state.

4. The compression molding assembly according to claim 3, wherein there are a plurality of movable slanting surface members and at least two said movable slanting surface members are connected by a synchronizing member to move in synchronization with each other.

5. The compression molding assembly according to claim 4, wherein the synchronizing member is a toothed wheel mounted to the moving mechanism to rotate along an axis parallel to movement of the moving mold and said movable slanting surface members are provided with teeth positioned to engage the toothed wheel.

6. The compression molding assembly according to claim 5, wherein the driving source is not connected to at least one movable slanting surface member and each said movable slanting surface member engages said toothed wheel so that when said driving source-connected slanting surface member is actuated, said toothed wheel transmits a displacement force to the at least one movable slanting surface member not connected to said driving force.

7. The compression molding assembly according to claim 1, further comprising a plate member attached to the moving die plate, the plate member being provided with a contacting portion which stops the movement of the moving die plate toward the stationary die plate at a connection with the stationary die plate and the moving mold is configured to compress and move toward the stationary mold by the moving mechanism after the contacting portion has connected with the stationary die plate.

8. The compression molding assembly according to claim 7, wherein the contacting portion is a selectively attachable spacer.

9. The compression molding assembly according to claim 3, wherein the first and second slanting surface members each comprise a ring-shaped member which is axially aligned along the moving direction of the moving mold, and one of the slanting surface members is rotatably movable.

10. An injection compression molding machine, comprising:

a stationary die plate with a stationary mold;

a moving die plate provided with a moving mold, the moving die plate being configured to move reciprocally to and away from the stationary die plate, so that the moving mold moves to open and close toward the stationary mold;

a mold clamping apparatus for reciprocally moving the moving die plate toward the stationary die plate;

a compression assembly located between said moving die plate and the moving mold, the compression assembly being configured to compress the moving mold toward the stationary mold; and a contact member attached to one of the moving die plate and the stationary die plate to limit movement of said moving die plate toward said stationary die plate by said mold clamping apparatus by abutting thereof, so that compression and movement of the moving mold to the stationary mold by said compression equipment begins upon the termination of movement of said moving die plate toward said stationary die plate.

11. The injection compression molding machine according to claim 10, wherein the contact member is a spacer which is releasably installed on said die plate to which said spacer is attached.

12. The injection compression molding machine according to claim 10 further including a first contact member attached to said moving die plate and a second contact member attached to said stationary die plate, said first and second contact members being positioned to abut as said moving mold is brought toward said stationary mold.

13. The injection compression molding machine according to claim 12 further including an extension leg releasably attached to one of said first and second contact members for selectively establishing the separation distance between the said moving mold and said stationary mold.

* * * * *

UNITED STATES PATENT AND TRADEMARK OFFICE
CERTIFICATE OF CORRECTION

PATENT NO. : 5 529 483
DATED : June 25, 1996
INVENTOR(S) : Tomokazu ABE et al.

It is certified that error appears in the above-indentified patent and that said Letters Patent is hereby corrected as shown below:

On the title page, item [75]
in the second inventor's designated city,
change "Sanjo" to ---Sanjyo---.

Signed and Sealed this

Twenty-second Day of October, 1996

*Attest:*

BRUCE LEHMAN

*Attesting Officer*     *Commissioner of Patents and Trademarks*